(12) United States Patent
Pfister et al.

(10) Patent No.: US 7,298,372 B2
(45) Date of Patent: Nov. 20, 2007

(54) SAMPLE RATE ADAPTIVE FILTERING FOR VOLUME RENDERING

(75) Inventors: Hanspeter Pfister, Arlington, MA (US); Matthias B. Zwicker, Gerlikon (CH); Wei Chen, Hangzhou (CN); Liu Ren, Pittsburgh, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 467 days.

(21) Appl. No.: 10/961,810

(22) Filed: Oct. 8, 2004

(65) Prior Publication Data

US 2006/0077204 A1  Apr. 13, 2006

(51) Int. Cl.
*G06T 17/00* (2006.01)
(52) U.S. Cl. .................................. 345/424
(58) Field of Classification Search ............ 345/424
See application file for complete search history.

(56) References Cited

U.S. PATENT DOCUMENTS

| 5,847,711 | A * | 12/1998 | Kaufman et al. | 345/424 |
| 6,664,961 | B2 * | 12/2003 | Ray et al. | 345/424 |
| 6,674,430 | B1 * | 1/2004 | Kaufman et al. | 345/419 |
| 7,133,041 | B2 * | 11/2006 | Kaufman et al. | 345/419 |

OTHER PUBLICATIONS

Lee Westover, "Footprint Evaluation for Volume Rendering," Aug. 1990, ACM SIGGRAPH Computer Graphics, vol. 24, No. 4, p. 367-376.*

Klaus Mueller, Roni Yagel, "Fast Perspective Volume Rendering with Splatting by Utilizing a Ray-Driven Approach," Oct. 28, 1996, Proceedings of the 7th Conference on Visualization '96, p. 65-72, 468.*

Klaus Mueller, Naeem Shareef, Jian Huang, Roger Crawfis, "High-Quality Splatting On Rectilinear Grids With Efficient Culling Of Occluded Voxels," Apr. 1999, IEEE Transactions on Visualization and Computer Graphics, vol. 5, No. 2, p. 116-134.*

Matthias Zwicker, Hanspeter Pfister, Jeroen van Baar, and Markus Gross, "EWA Volume Splatting," Oct. 21, 2001, Proceedings of the Conference on Visualization '01, p. 29-36.*

Daqing Xue, Roger Crawfis, "Efficient Splatting Using Modern Graphics Hardware," 2003, Journal of Graphics Tools, vol. 8, No. 3, p. 1-21.*

S. Roettger, S. Guthe, D. Weiskopf, T. Ertl, and W. Strasser. Smart hardware-accelerated volume rendering. In *Eurographics/IEEE TCVG Symposium on Visualization 2003*, 2003.

C. P. Botha and F. H. Post. Shellsplatting: Interactive rendering of anisotropic volumes. In *Proceedings of 2003 Joint Eurographics—IEEE TCVG Symposium on Visualization*, May 2003.

M. Botsch and L. Kobbelt. High-quality point-based rendering on modern GPUs. In *Proceedings of the 2003 Pacific Graphics Conference*, pp. 335-343, 2003.

K. Engel, M. Kraus, and T. Ertl. High-quality pre-integrated volume rendering using hardware-accelerated pixel shading. In *Proceedings of the 2001 ACM SIGGRAPH/Eurographics Workshop on Graphics hardware*, pp. 9-16. ACM Press, 2001.

(Continued)

*Primary Examiner*—Ulka J. Chauhan
*Assistant Examiner*—Jason M Repko
(74) *Attorney, Agent, or Firm*—Dirk Brinkman; Clifton D. Mueller; Gene V. Vinokur

(57) ABSTRACT

A method renders a volume data set including a plurality of voxels. A sampling rate for each voxel in a volume data set is determined. Each voxel is filtered according to the sampling rate and pixels for an output image are generated from the filtered voxels.

12 Claims, 3 Drawing Sheets

OTHER PUBLICATIONS

J. Huang, R. Crawfis, and D. Stredney. Edge preservation in volume rendering using splatting. In *Proceedings of the 1998 IEEE symposium on Volume visualization*, pp. 63-69, NC, USA, 1998.

J. Huang, K. Mueller, N. Shareef, and R. Crawfis. Fastsplats: Optimized splatting on rectilinear grids. In *Proceedings of the 2000 IEEE Visualization Conference*, pp. 219-227, USA, Oct. 2000.

L. Lippert and M. Gross. Fast wavelet based volume rendering by accumulation of transparent texture maps. In *Proceedings of Eurographics 1995*, pp. 431-443, Sep. 1995.

K. Mueller and R. Crawfis. Eliminating popping artifacts in sheet buffer-based splatting. In *Proceedings of the 1998 IEEE Visualization Conference*, pp. 239-246, Ottawa, Canada, Oct. 1998.

K. Mueller, T. Moeller, and R. Crawfis. Splatting without the blur. In *Proceedings of the 1999 IEEE Visualization Conference*, pp. 363-370, San Francisco, CA, USA, Oct. 1999.

K. Mueller, T. Moeller, J.E. Swan, R. Crawfis, N. Shareef, and R. Yagel. Splatting errors and antialiasing. *IEEE Transactions on Visualization and Computer Graphics*, 4(2):178-191, Apr.-Jun. 1998.

* cited by examiner

SAMPLE RATE ADAPTIVE FILTERING FOR VOLUME RENDERING

FIELD OF THE INVENTION

The present invention relates generally to computer graphics, and more particularly to rendering three-dimensional graphics data by splatting.

BACKGROUND OF THE INVENTION

Hardware-accelerated volume rendering methods for rectilinear grids include ray casting, texture slicing, shear-warp and shear-image rendering, and splatting, see, Roettger et al. "*Smart hardware-accelerated volume rendering,*" Eurographics/IEEE TCVG Symposium on Visualization, 2003, texture slicing, see, Rezk-Salama, et al., "*Interactive volume on standard pc graphics hardware using multi-textures and multi-stage rasterization,*" Proceedings of the ACM SIG-GRAPH/EUROGRAPHICS workshop on Graphics hardware, pages 109-118, ACM Press, 2000, Engel, et al., "*High-quality pre-integrated volume rendering using hardware-accelerated pixel shading,*" Proceedings of the 2001 ACM SIGGRAPH/Eurographics Workshop on Graphics hardware, pages 9-16. ACM Press, 2001, Pfister et al., "*The VolumePro real-time ray-casting system,*" Proceedings of ACM SIGGRAPH 1999, pages 251-260. ACM Press, 1999, Wu, et al., "*Shear-image order ray casting volume rendering,*" ACM Symposium on Interactive 3D Graphics, pages 152-162, June, 2003, and Pfister, "*The Visualization Handbook,*" chapter Hardware-Accelerated Volume Rendering, Chris Johnson and Chuck Hansen (Editors), Academic Press, 2004.

Splatting reconstructs a continuous function by sampling a scalar field of values using 3D reconstruction kernels associated with each scalar value. For volume rendering, the continuous function is mapped to screen space as a superposition of pre-integrated 3D kernels, which are called 2D footprints, see, Westover, "*Footprint evaluation for volume rendering,*" Proceedings of ACM SIGGRAPH 1990, pages 367-376, August 1990. Splatting offers flexibility in terms of volume grids, including non-rectilinear, and mixing with point-sampled geometry, see Mao, "*Splatting of non rectilinear volumes through stochastic resampling,*" IEEE Transactions on Visualization and Computer Graphics, 2(2):156-170, 1996, and Zwicker, et al., "*Ewa volume splatting,*" IEEE Visualization 2001, pages 29-36, 2001.

Zwicker et al. describe a method for aliasing-free splatting. However, achieving interactive high quality EWA splatting is still difficult due to the computational complexity of EWA filtering.

Splatting benefits from the use of pre-integrated reconstruction kernels. Since Westover's original work, see above, and Westover, "*Interactive volume rendering,*" C. Upson, editor, Proceedings of the Chapel Hill Workshop on Volume Visualization, pages 9-16, May 1989, most volume splatting methods focus on improving image quality, including ray-driven perspective splatting, edge preservation, eliminating popping and blur, and image-aligned splatting, see, Mueller, et al., "*Fast perspective volume rendering with splatting by utilizing a ray driven approach,*" Proceedings of the 1996 IEEE Visualization Conference, pages 65-72, October 1996, Huang et al, "*Edge preservation in volume rendering using splatting,*" Proceedings of the 1998 IEEE symposium on Volume visualization, pages 63-69, 1998, Mueller et al., "*Eliminating popping artifacts in sheet buffer-based splatting,*" Proceedings of the 1998 IEEE Visualization Conference, pages 239-246, October 1998, Mueller et al., "*Splatting without the blur,*" Proceedings of the 1999 IEEE Visualization Conference, pages 363-370, October 1999, and Mueller et al., "*High-quality splatting on rectilinear grids with efficient culling of occluded voxels,*" IEEE Transactions on Visualization and Computer Graphics, 5(2): 116-134, 1999.

With splatting, the volume data are interpreted according to 3D reconstruction kernels, one kernel for each particle, discrete sample point, or voxel. Each 3D reconstruction kernel has the effect of absorbing and emitting light. Integrals are predetermined separately across each 3D kernel, resulting in 'footprint' functions. Each footprint function 'spreads' the contribution of each point over nearby pixels in an output image. Typically, the span of the footprint is in the order of two to five pixels. The 'smeared' contributions of each voxel in the 3D volume are composited, i.e., accumulated, in a front-to-back or back-to-front order to produce the pixels of the output image.

Aliasing problems in volume splatting is described by Swan et al., "*An anti-aliasing technique for splatting,*" Proceedings of the 1997 IEEE Visualization Conference, pages 197-204, October, 1997, and Mueller, et al., "*Splatting errors and antialiasing,*" IEEE Transactions on Visualization and Computer Graphics, 4(2):178-191, April-June 1998. There, a distance-dependent stretch of the footprints was used to make the footprints act as low-pass filters.

Heckbert, in "Fundamentals in Texture Mapping and Image Warping" Master's Thesis, University of California at Berkeley, Department of Electrical Engineering and Computer Science, 1989, describes a rendering method that uses elliptical weighted average (EWA) filters to avoid aliasing of surface textures. However, that method only operates on regularly sampled 2D texture. In other words, that method cannot be used directly with irregular point samples or volume data sets.

Zwicker et al., extended Heckbert's method to represent and render texture functions on irregularly point-sampled surfaces, and to volume splatting, see Zwicker et al., "*Surface splatting,*" Proceedings of A CM SIGGRAPH 2001, pages 371-378, July 2001, Zwicker et al., "*Ewa splatting,*" IEEE Transactions on Visualization and Computer Graphics, 8(3):223-238, 2002, and Zwicker et al., "*Ewa volume splatting,*" IEEE Visualization 2001, pages 29-36, 2001.

Point-based models have been successfully rendered on a graphics processing unit (GPU), see, Rusinkiewicz et al., "*Qsplat: A multiresolution point rendering system for large meshes,*" Proceedings of ACM SIGGRAPH 2000, pages 343-352, July 2000, Botsch et al., "*High-quality point-based rendering on modern GPUs,*" Proceedings of the 2003 Pacific Graphics Conference, pages 335-343, 2003, and Guennebaud et al., "*Efficient screen space approach for hardware accelerated surfel rendering,*" Proceedings of the 2003 Vision, Modeling and Visualization Conference, pages 1-10, November 2003.

Ren, et al., in "*Object-space ewa surface splatting: A hardware accelerated approach to high quality point rendering,*" Proceedings of Eurographics 2002, pages 461-470, September 2002, described an object space formulation for EWA surface splats and an efficient implementation of the formulation on graphics hardware. For each point in object space, quadrilaterals, which were texture-mapped with a Gaussian texture, were deformed to result in a correct screen-space EWA splat after projection.

Other prior art method includes opacity-based culling, fast splat rasterization, hierarchical splatting, object and image space coherence, shell splatting, 3D adjacency data structure, and post-convolved splatting, see, Mueller et al., "*High-quality splatting on rectilinear grids with efficient culling of occluded voxels*," IEEE Transactions on Visualization and Computer Graphics, 5(2):116-134, 1999, Huang et al., "*Fastsplats: Optimized splatting on rectilinear grids*," Proceedings of the 2000 IEEE Visualization Conference, pages 219-227, October 2000, Laur et al., "*Hierarchical splatting: A progressive refinement algorithm for volume rendering*," Proceedings of ACM SIGGRAPH 1991, pages 285-288, August 1991, Ihm et al., "*On enhancing the speed of splatting with indexing*," Proceedings of the 1995 IEEE Visualization Conference, pages 69-76, 1995, Botha et al., "*Shellsplatting: Interactive rendering of anisotropic volumes*," Proceedings of 2003 Joint Eurographics—IEEE TCVG Symposium on Visualization, May 2003, Orchard et al., "*Accelerated splatting using a 3d adjacency data structure*," Proceedings of Graphics Interface 2001, pages 191-200, September 2001, and Neophytou et al., "*Post-convolved splatting*," Proceedings of the symposium on Data visualisation 2003, pages 223-230, Eurographics Association, 2003.

Lippert et al., in "*Fast wavelet based volume rendering by accumulation of transparent texture maps*," Proceedings of Eurographics 1995, pages 431-443, September 1995, described a splatting method that directly uses a wavelet representation of the volume data. A hierarchical and frequency sensitive splatting method is based on wavelet transformations and pre-computed splat primitives, which accomplished view-dependent and transfer function-dependent splatting, Welsh, et al., in "*A frequency-sensitive point hierarchy for images and volumes*," Proceedings of the 2003 IEEE Visualization Conference, Seattle, USA, October 2003. None of those methods have been implemented completely on a GPU.

Some GPU-accelerated splatting methods use texture mapping hardware for the projection and scan-conversion of footprints, see Crawfis et al., "*Texture splats for 3d scalar and vector field visualization*," Proceedings of the 1993 IEEE Visualization Conference, pages 261-266, 1993, and Botha, et al., above.

EWA Volume Splatting

Volume splatting interprets volume data as a set of particles that are absorbing and emitting light. To render the data, line integrals are precomputed separately across each particle, resulting in 2D footprint functions or splats in the image plane. The splats are composited back-to-front to determine the output image. Particles are represented by 3D reconstruction kernels A common choice is 3D elliptical Gaussian kernels. The notation $G_V(t-p)$ represents an elliptical Gaussian kernel centered at a 3D point p with a 3×3 variance matrix V:

$$G_V(t-p) = \frac{1}{(2\pi)^{3/2}|V|^{1/2}} e^{-\frac{1}{2}(t-p)^T V^{-1}(t-p)}. \quad (1)$$

In theory, Gaussian kernels have infinite support. In practice, the kernels are truncated to a given cutoff radius r, i.e., the kernels are evaluated only in a range $$(t-p)^T V^{-1}(t-p) \leq r^2, \quad (2)$$

where usually $1 \leq r \leq 3$. Furthermore, the choice of Gaussians as 3D kernels guarantees a closed-form footprint function after integration along viewing rays.

However, during perspective rendering, the splatting process usually results in aliasing artifacts due to a changing of sampling rate along the viewing rays while rendering. EWA volume splatting minimizes the artifacts by convolving the footprint function with a 2D low-pass filter, which yields an aliasing-free footprint function called the EWA volume resampling filter.

Zwicker, et al., in "*Ewa volume splatting*," IEEE Visualization 2001, pages 29-36, 2001, described a closed-form representation of the EWA volume resampling filter that is based on the following two assumptions. First, the low-pass filter takes the form of a 2D Gaussian reconstruction kernel function. Second, a non-linear perspective transformation, which maps reconstruction kernels to image space, is linearly approximated using a Jacobian matrix.

To summarize the derivation of the EWA volume resampling filter, a rotational part of the viewing transformation that maps object space to camera space coordinates is given by a 3×3 matrix W. Denote camera space coordinates by $u=(u_0, u_1, u_2)$. Normalized, the origin of the camera space $u=0$ is at a center of projection and an image plane is a plane at a distance $u_2=1$. Camera space coordinates of a voxel k are given by $u_k$. Image space coordinates are denoted by x, and the image space position of voxel k is $x_k$. Further, the Jacobian matrix of the perspective projection at a point $u_k$ in camera space to image space is a 3×3 matrix $J_{u_k}$:

$$J_{u_k} = \begin{pmatrix} \frac{1}{u_{k_2}} & 0 & -\frac{u_{k_0}}{u_{k_2}^2} \\ 0 & \frac{1}{u_{k_2}} & -\frac{u_{k_1}}{u_{k_2}^2} \\ \frac{u_{k_0}}{\|(u_{k_0}, u_{k_1}, u_{k_2})\|} & \frac{u_{k_1}}{\|(u_{k_0}, u_{k_1}, u_{k_2})\|} & \frac{u_{k_2}}{\|(u_{k_0}, u_{k_1}, u_{k_2})\|} \end{pmatrix}. \quad (3)$$

Given the 3×3 variance matrix $V_k''$ of a reconstruction kernel k in object space, its transformation through camera space to image space is $V_k = J_{u_k} W V_k'' W^T J_{u_k}^T$.

The EWA volume resampling filter $\rho_k(x)$ is obtained by integrating the reconstruction kernel in image space along viewing rays. The reconstruction kernel is convolved with the Gaussian low-pass filter, which, as shown by Zwicker et al, above, yields the 2D footprint function $$\rho_k(x) = \frac{1}{2\pi |J_{u_k}^{-1}| \|W^{-1}\| |\hat{V}_k + V_h|^{\frac{1}{2}}} e^{-\frac{1}{2}(x-x_k)^T M_k (x-x_k)}, \quad (4)$$

where $$M_k = (\hat{V}_k + V_h)^{-1}. \quad (5)$$

There, $V_h$ is a 2×2 variance matrix of the Gaussian low-pass filter, which is usually chosen to be the identity matrix. The 2×2 variance matrix $\hat{V}_k$ is obtained by skipping the third row and column of $V_k^1$. A matrix with a hat symbol, '^', denotes the result of skipping its third row and column.

The problem with the prior art filtering is that after a particular filter is selected, the same filter is used for the entire volume data set, without considering how the volume voxels were generated, and without considering how the data set is sampled along the viewing rays during the generation of the output image.

It is desired to solve this problem.

SUMMARY OF THE INVENTION

The invention provides a hardware-accelerated adaptive elliptical weighted average (EWA) volume splatting method that uses adaptive filtering. The EWA splatting method combines a Gaussian reconstruction kernel with a low-pass image filter to render high quality images without aliasing artifacts or excessive blurring.

The adaptive filtering reduces the number of operations required in EWA splatting, and can be implemented efficiently on conventional graphics processing units (GPUs). The method includes interactive pre-classification. To accelerate rendering, splat geometry and 3D volume data are stored locally in a memory of the GPU.

DETAILED DESCRIPTION OF THE PREFERRED EMBODIMENT

Introduction

Figure 1:
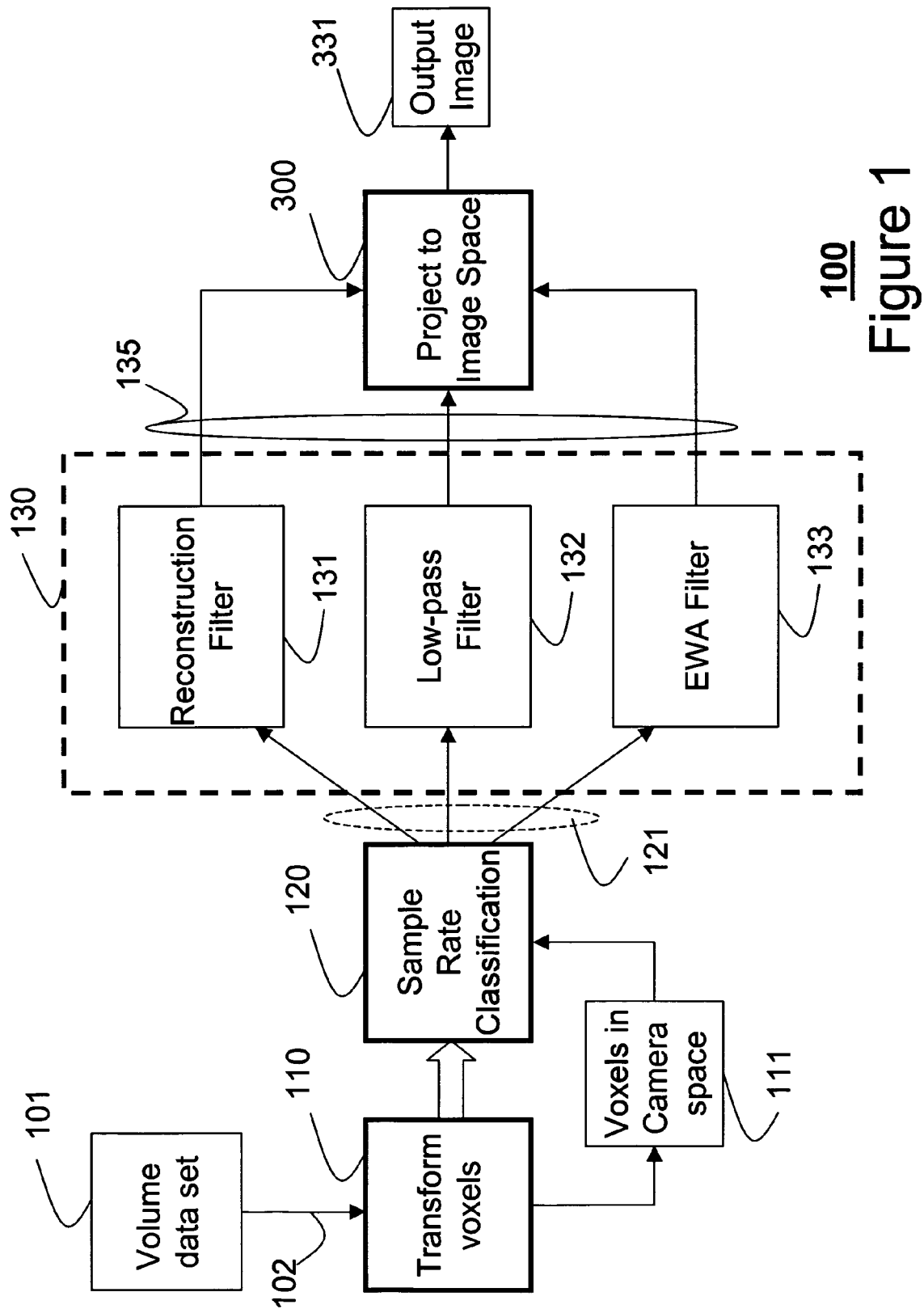
FIG. 1 is a block diagram of sample rate adaptive filtering according to the invention.

FIG. 1 shows a system and method for rendering 100 according to our invention. A volume data set includes voxels. The voxels can be generated using a constant sampling rate. In which case, the volume data set is said to be regular. If a varying sampling rate is used during the generation, then the volume date set is irregular. For the purpose of this description, we call the rate at which the voxels are generated the first sampling rate.

During rendering, the voxels in the data set are sampled along viewing rays to generate pixels in an output image. For the purpose of this description, we call the rate at which the voxels are sampled the second sampling rate. This second sampling rate can also be regular or irregular.

According to the invention, we filter the voxels adaptively during the rendering either according to the first rate, the second rate, or both the first and second rates.

Volume Rendering

As shown in FIG. 1, voxels 102 of a 3D volume data set 101 are transformed 110 from object space to camera space 111 and classified 120 according to a sampling rate classification, as described above.

The classifying step 120 assigns a type of filtering 130 to be performed on each classified voxel 121. Each classified voxel is filtered 130 according to the classification 120. Filtered voxels 135 are projected 300 to image space to produce an output image 331.

The classification 120 determines whether the voxels 121 are filtered 130 using a reconstruction filter 131, a low-pass filter 132, or an EWA volume resampling filter 133.

Figure 2:
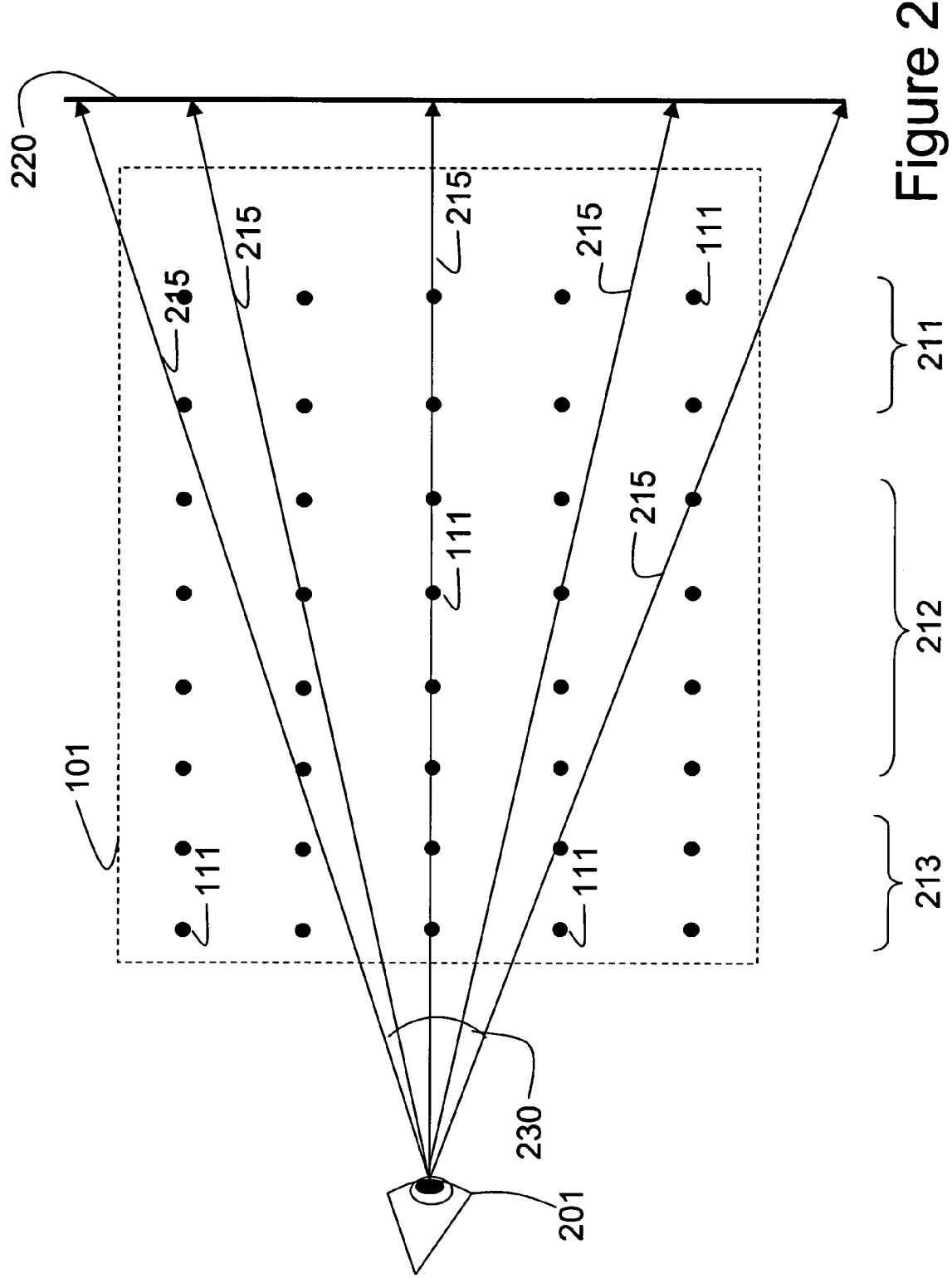
FIG. 2 is a schematic of sample rate adaptive filtering according to the invention.

FIG. 2 is used to describe some of the details of our rate adaptive filtering. Voxels 102 of the volume data set 101 are transformed 110 to camera space between an image plane 220 and a view-point 201. The transformed voxels 111 are classified 120 as being sampled at a low rate 211, a normal rate 212, or a high rate 213, relative to each other.

In the case of perspective rendering, the second sampling rate corresponds to a distance from the view-point 201 due to the diverging 230 viewing rays 215. Note, the first sampling rate of the volume data set is fixed in this case. In perspective rendering, viewing rays originating at the view-point diverge. This is in contrast to orthogonal or rectilinear rendering, where viewing rays originate from multiple view-points and are parallel to each other and the second sampling rate is usually fixed.

However, the same principals still hold, in case the data set itself is irregular due to the a varying first sample rate. For example, in an irregularly sampled data set, it is the local first sampling rate that determines the classification of the voxels, and the selection of the corresponding filters.

At low sampling rate distance 211, i.e., far from the viewpoint, the second sampling rate along the diverging viewing rays in camera space is less than the first sampling rate of the volume data set. If an EWA volume resampling filter is applied to the voxels at the far distance 211, prefiltering is required to reduce high frequency components in the volume data to avoid aliasing artifacts. In this case, the low-pass filter convolved with the reconstruction filter in an EWA volume resampling filter dominates the EWA filter. Therefore, the EWA volume resampling filter is approximated with a low-pass filter 132 when the sampling rate, (first or second) is low. The invention applies a low-pass filter 132 to voxels 111 classified 120 at the rate 211. This avoids the complex EWA computations of the prior art, while maintaining the quality of the output image 331.

When the volume data are classified 120 as being at a high sampling rate distance, i.e., near the view point, the second sampling rate along the diverging viewing rays 215 is relatively higher than the first sampling rate of the volume data set. The low-pass filter convolved with an EWA filter, though not a dominant component in the EWA filter, can degrade the output image due to blurring.

Therefore, approximating the EWA resampling filter by applying the reconstruction filter alone, without the convolution with the low-pass filter in an EWA volume resampling filter, reduces the number of required operations, and yields a better output image. Therefore, the invention applies only the reconstruction filter 131 to the voxels 213.

In the intermediate distance 212 between the two far and near distances 211 and 213, the second sampling rate is determined to be approximately comparable to the first sampling rate of the volume data set. Therefore, the invention applies the EWA filtering 133 to voxels 111 classified 120 as being at the middle distance 212 to the view-point 201.

As a consequence, in our adaptive EWA splatting approach, we classify each voxel 102 into one of the above three sampling rate categories 211-213 for efficient determination of footprint functions while preserving high image quality of EWA splatting.

Sampling Rate Dependent Classification

We now describe our sampling rate dependent classification criteria for adaptive EWA volume splatting based on an analysis of the EWA filter described with respect to equation (4).

The 2×2 variance matrix $M_k(x)$ of equation (5) determines the size and shape of the footprint, which is an ellipse. Because matrices $W$, $V_k''$ and $V_h$ are the same for all voxels in one view, the footprint of each voxel depends only on the Jacobian matrix $J_{u_k}$.

If the variance matrix $V_k''$ is symmetric and the cutoff radii, see equation (2), of the reconstruction and the low-pass filters are respectively $r_k$ and $r_h$, then the matrix $\hat{V}_k$ is symmetric and the minor and major radii of the ellipse can be derived from equation 4 as follows:

$$r_0 = \sqrt{\frac{r_k^2}{u_{k_2}^2} + r_h^2}, \quad r_1 = \sqrt{\frac{r_k^2(u_{k_0}^2 + u_{k_1}^2 + u_{k_2}^2)}{u_{k_2}^4} + r_h^2}. \quad (6)$$

A depth of a voxel in camera space $u_{k_2}$ largely determines the ellipse radii as can be seen in equation 6 above. The distance between the view-point 201 and the image plane 220 is normalized to 1.0. It can be shown that $u_{k_0}/u_{k_2}$ and $u_{k_1}/u_{k_2}$ range from $-\tan(fov/2)$ to $\tan(fov/2)$, where fov is a view angle 230. Hence, the maximum value of $(u_{k_0}^2 + u_{k_1}^2 + u_{k_2}^2)/u_{k_2}^2$ is $+(2.0 \times \tan(fov/2)^{2})$.

Therefore, conservative adaptive criteria can be determined by only considering a voxel camera space coordinate $u_{k_2}$.

To determine the radius $r_0$, the radius $r_h$ is discarded, given that $r_k/u_{k_2}$ is much larger than $r_h$. In this case, $r_h$ can be discarded for the determination of $r_1$ as well. On the other hand, if $r_k \times (1.0+(2.0 \times \tan(fov/2)^{2}))/u_{k_2}$ is smaller then $r_h$, the radius $r_1$ can be approximated by $r_h$.

From the above analysis, we derive the following adaptive filtering classifications $H_k(x)$ with two controlling parameters $c_{min}$ and $c_{max}$:

$$\begin{cases} H_k(x) = x^T \cdot \hat{V}_k^{-1} \cdot x, & \text{if } u_{k_2} < \frac{r_k}{r_h} \times c_{min} \\ H_k(x) = x^T \cdot V_h^{-1} \cdot x, & \text{if } u_{k_2} > \frac{r_k}{r_h} \times c_{max} \\ H_k(x) = x \cdot (\hat{V}_k + V_h)^{-1} \cdot x, & \text{otherwise} \end{cases} \quad (7)$$

Based on the above criteria, our adaptive filtering selects one of the resampling filters 131-133 to be used for efficient interactive rendering. In equations (7), magnification criteria for selecting the reconstruction filter 131 is listed first, minification criteria for selecting the low-pass filter 132 is second, and criteria for selecting the EWA volume resampling filter 133 is third.

The parameters $c_{min}$ and $c_{max}$ can be adjusted to achieve a desired balance between efficiency of operation and quality of image according to user preference and application need.

Our adaptive rendering based on sampling rates can work with regular, rectilinear and irregular volume data sets. It can also be incorporated in prior art splatting systems.

To reduce the additional operations required by the classification 130, the volume data are organized as local neighborhoods or patches in a spatial data structure, described below in detail with respect to FIG. 3.

The voxels are classified on a per patch basis, and the same filter is applied to all voxels in a patch that has the same classification. This is strictly for expediency. In an ideal system, each voxel is classified and filtered accordingly.

Hardware Accelerated Rendering

We can implement our adaptive EWA filtering in a hardware-accelerated volume splatting framework for rendering regular or rectilinear volume data sets.

Our framework is based on an axis-aligned volume splatting scheme with three traversal orders along the three major axes.

Adaptive Splatting

In the preferred embodiment, we perform volume splatting using a patch-based classification scheme.

Figure 3:
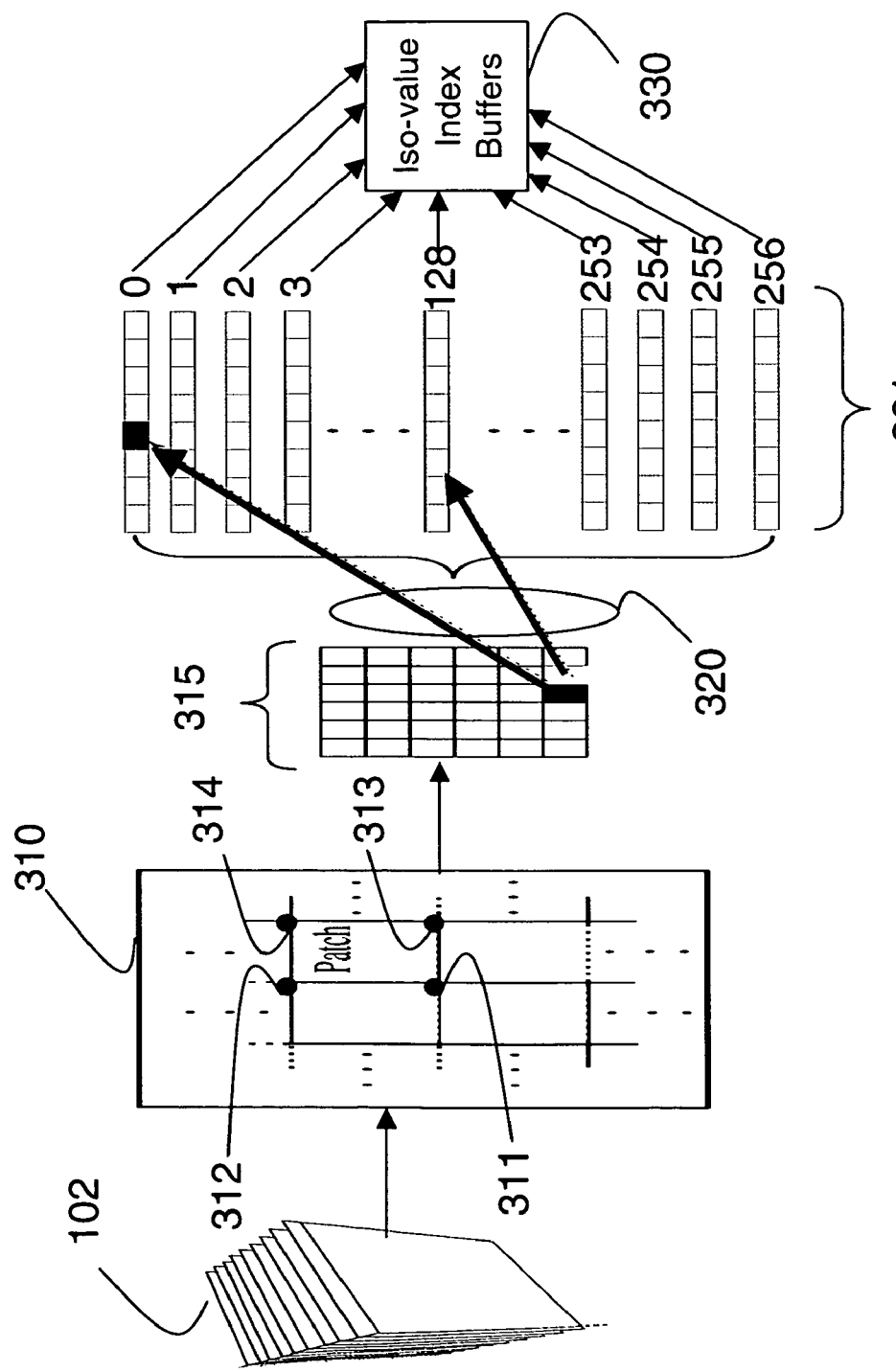
FIG. 3 is a block diagram of data structures according to the invention.

As shown in FIG. 3, voxels 102 of the volume data set 101 can be organized as slices 310, and the voxels 102 of each slice 310 are grouped into uniform rectangular patches 315. For the sample rate classification 120, we determine the camera space coordinate $u_{k_2}$ of each of the four corner voxels, i.e., vertices, 311-314 of each patch, and evaluate the criteria given in Equation 7.

If all four vertices of the patch meet the magnification criterion, the reconstruction filter 131 is used as the footprint function.

If all four vertices of a patch meet the minification criterion, the low-pass filter 132 is used as the footprint function.

Otherwise, the full EWA resampling filter is applied 133.

We set $c_{min}$ and $c_{max}$ in Equation 7 to 0.3, and $2.0 \times (1.0+(2.0 \times \tan(fov/2)^{2}))$ respectively for all examples herein.

Our splatting method relies on proxy geometry, i.e., textured quadrilaterals, as rendering primitives that represent the footprint functions. The texture on each quad encodes a 2D unit Gaussian function. Note that the geometry of the quad is deformed to stretch and scale the unit Gaussian texture, such that a projection of the quad to the image plane matches the footprint function. This is achieved using programmable vertex shaders.

A textured quadrilateral representing a splat is associated with each voxel. Splats are processed in two stages. In the first stage, the contributions from splats in one slice are added in a buffer. Then, back-to-front or front-to-back composition of each slice is performed to yield the output image. We call this composition method slice-by-slice composition.

Optionally, composition can be performed directly, without using the buffer. We call this simple composition method splat-every-sample composition.

In particular, the geometry of the quadrilateral can be derived by analyzing the EWA resampling filter. In our adaptive scheme, we implement a different filter for each of the cases in Equation 7, and we select the appropriate filter based on our per-patch evaluation described above. During rasterization of the proxy quads, the filter weight, the color and the illumination components of each pixel are based on voxel attributes in the volume texture.

Interactive Opacity Culling

Interactive opacity culling as described herein is a useful pre-processing step for interactive exploration of volume data. In the prior art, all of the voxels of the volume data set are rendered, which is not efficient because transparent voxels are not culled. Unnecessary rendering of transparent voxels can be avoided using our interactive opacity culling. Here, only non-transparent voxels are rendered, which typically account only for 5%-20% of all voxels in the volume data set.

However, in our retained-mode hardware implementation, opacity culling requires collecting indices of the vertices for those non-transparent voxels and loading an index buffer to the graphics hardware whenever a user selected transfer function for determining which voxels are not transparent is changed. Because the construction of the index buffer is time-consuming and loading it to graphics memory involves a significant amount of data transfer between the processor and GPU, changes of the transfer function cannot be rendered at interactive rates.

Referring back to FIG. 3, we solve this problem by constructing an auxiliary data structure in an optional pre-processing step. The basic idea uses a list-based splatting method, where a single iso-value list is constructed for the entire volume data set.

We bucket sort 320 the voxels 102 of each slice 310 based on intensity values of the voxels. The sorting produces iso-value lists 321 for each slice, where each list includes voxels having the same intensity values. Note that when describing volume data, the term density is interchangeable with intensity.

Indices of proxy geometry corresponding to the iso-value lists are sorted accordingly, and arranged into iso-value index buffers 330. The index buffers, which are pre-loaded in graphics hardware before interactive rendering, span 256 intervals of iso-value voxels. Practically, the index buffers are placed in video memory or AGP memory, depending on index buffer size.

Pointers to the start of each iso-value index are maintained in main memory. When the transfer function is interactively changed from a first range of intensity values to a second range of intensity values, the pointers to voxels having intensity values in the second range according to the changed transfer function are determined. The voxels indicated by the pointers are visible voxels which are transformed into camera space and classified by our rendering method 100.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer-implemented method for rendering a volume data set including a plurality of voxels using a graphic processor unit, comprising the steps of:
    determining a sampling rate for each voxel in a volume data set stored in a memory of a graphics processing unit;
    transforming the plurality of voxels from an object space to a camera space;
    organizing the transformed voxels in slices;
    grouping the transformed voxels in each slice into a plurality of patches;
    determining, for each corner voxel of a patch, a sampling rate of the corner voxel in camera space;
    classifying the patch as at a particular sampling rate if all of the corner voxels are at the particular sampling rate;
    filtering each voxel in the patch according to the classification according to the sampling rate;
    generating an output image from the filtered voxels; and
    rendering the output image.

2. The method of claim 1, in which the voxels in the volume data set are generated at a first sampling rate, and the filtering is according to the first sampling rate.

3. The method of claim method of claim 1, in which the pixels of the output image are generated at a second sampling rate, and the filtering is according to the second sampling rate.

4. The method of claim 1, in which a first sampling rate is determined while generating the volume data set and a second sampling rate is determined while rendering, and the filtering each voxel is according to the first and second sampling rate.

5. The method of claim 2, in which the first sampling rate is constant.

6. The method of claim 2, in which the first sampling rate is varying.

7. The method of claim 3, in which the second sampling rate is constant.

8. The method of claim 3 in which the second sampling rate is varying.

9. The method of claim 1, in which the filtering is low-pass filtering at a low sampling rate.

10. The method of claim 1, in which the filtering is elliptical weighted average filtering at a normal sampling rate.

11. The method of claim 1, in which the filtering is reconstruction filtering at a high sampling rate.

12. The method of claim 1, further comprising:
    organizing the plurality of voxels of the volume data set into slices;
    sorting the voxels in each slice into a lists according to intensity values of the voxels;
    storing each list as an index in an index buffer;
    transforming, from an object space to a view-independent camera space. for each slice, only voxels in index buffers having a predetermined intensity value.

* * * * *